United States Patent [19]

Murayama

[11] 4,294,131

[45] Oct. 13, 1981

[54] TRACTOR TRAVELLING SYSTEM TRANSMISSION MECHANISM

[75] Inventor: Yoshinobu Murayama, Sakai, Japan

[73] Assignee: Kubota, Ltd., Osaka, Japan

[21] Appl. No.: 909,790

[22] Filed: May 26, 1978

[30] Foreign Application Priority Data

Nov. 10, 1977 [JP] Japan ................... 52-135811

[51] Int. Cl.³ ................. F16H 37/00; F16H 37/06
[52] U.S. Cl. .................... 74/15.4; 74/15.66; 74/691; 74/740
[58] Field of Search ............... 74/740, 691, 194, 15.4, 74/15.66, 15.6, 15.63; 280/456 A, 460 A

[56] References Cited

U.S. PATENT DOCUMENTS

| | | | |
|---|---|---|---|
| 932,814 | 8/1909 | Saussard | 74/691 X |
| 1,440,536 | 1/1923 | Gill | 74/194 |
| 2,086,491 | 7/1937 | Dodge | 74/691 |
| 2,446,462 | 8/1948 | Dodge | 74/691 X |
| 2,521,729 | 9/1950 | Keese | 74/15.63 X |
| 2,716,357 | 8/1955 | Rennerfelt | 74/691 |
| 2,757,557 | 8/1956 | Hoffman | 74/740 |
| 2,779,260 | 1/1957 | Oreland et al. | 280/456 A X |
| 2,932,988 | 4/1960 | Flynn et al. | 74/740 X |
| 2,975,656 | 3/1961 | Haverlender | 74/15.63 X |
| 2,982,153 | 5/1961 | Albertson et al. | 74/740 |
| 3,065,643 | 11/1962 | Mark et al. | 74/15.63 |
| 3,196,696 | 7/1965 | Ritter | 74/15.63 |
| 3,204,468 | 9/1965 | Ruoff | 74/15.4 |
| 3,295,611 | 1/1967 | Bunting et al. | 280/460 A |
| 3,406,597 | 10/1968 | De Brie Perry et al. | 74/691 X |
| 4,109,550 | 8/1978 | Murayama | 74/691 |

FOREIGN PATENT DOCUMENTS

| | | | |
|---|---|---|---|
| 495006 | 8/1953 | Canada | 74/740 |
| 1085045 | 7/1960 | Fed. Rep. of Germany | 74/15.4 |
| 1120894 | 12/1961 | Fed. Rep. of Germany | 74/15.4 |
| 1226683 | 7/1960 | France | 74/740 |
| 909159 | 10/1962 | United Kingdom | 74/15.4 |

Primary Examiner—Leslie Braun
Attorney, Agent, or Firm—Wm. Jacquet Gribble

[57] ABSTRACT

A tractor travelling system transmission mechanism for providing tractor travelling system stepless speed change including the stop status of a tractor, and tractor forward/backward changeover, by using a friction type stepless transmission means, a planet reduction gearing and a forward/reverse changeover gearing, which is independently disposed without commonly utilizing the friction type stepless transmission means or the planet reduction gearing as a forward/reverse changeover means.

4 Claims, 3 Drawing Figures

TRACTOR TRAVELLING SYSTEM TRANSMISSION MECHANISM

BACKGROUND OF THE INVENTION

1. Field of the Invention

The present invention relates to a tractor travelling system transmission mechanism comprising a friction type stepless transmission means interlocked with an engine, a planet reduction gearing and a forward/reverse changeover gearing, wherein in the planet reduction gearing a first component element thereof is interlocked with the engine, a second component element thereof is interlocked with the stepless transmission means and a third component element thereof is interlocked with the travelling wheels.

2. Description of the Prior Art

In order to steplessly change the travelling speed of a tractor without operating clutch means, it may be considered to use a hydraulic stepless transmission mechanism. However, there is a disadvantage that a tractor itself becomes expensive due to costly hydraulic machinery to be used therein.

Therefore, in order to steplessly change the travelling speed by using economical mechanical structures, several methods have been researched and developed by utilizing a friction type stepless transmission means, a planet reduction gearing and a forward/reverse changeover gearing. However, in such transmission mechanisms there has been also a problem in the forward/reverse changeover system as described below.

Among conventional transmission mechanisms of this kind, there is one type in which the forward/reverse changeover is also provided by the friction type stepless transmission mechanism. In such a transmission mechanism a follower shift roller is contacted with a disc rotated at a uniform speed, and the contact point of the shift roller with the disc is radially changed, thereby to provide stepless speed change. Consequently, when intending to provide the forward/reverse changeover by this friction type stepless transmission mechanism, it is required to change this contact point of the shift roller while passing it across the center point of the disc, and subsequently the contact area of the shift roller with the disc becomes very broad. It is therefore inevitable in such a transmission mechanism to use a low speed transmission area of low power transmission efficiency, thereby to easily provoke slips, thus providing no accurate speed change operation.

It may also be considered to arrange a transmission mechanism in which forward/reverse changeover is provided by changing the direction of the revolution of planet gears, which are one component element of the planet reduction gearing, around the sun gear. However, in order to change the direction of the revolution of the planet gears around the sun gear it is necessary to greatly change the number of revolutions of the internal gear of the planet reduction gearing, requiring also a broad transmission area of the friction type stepless transmission mechanism which controls the number of revolutions of this internal gear. Therefore, a defect similar to the abovementioned one would not be overcome.

SUMMARY OF THE INVENTION

The present invention provides a tractor travelling system transmission mechanism which is intended to cheapen the whole structure of the tractor by using a mechanical mechanism, simultaneously with overcoming such a slip trouble in the friction type stepless transmission mechanism, thereby to carry out accurate speed change operation.

A tractor travelling system transmission mechanism in accordance with the present invention comprises a friction type stepless transmission means interlocked with an engine, a planet reduction gearing, and a forward/reverse changeover gearing, in said planet reduction gearing a first component element thereof being interlocked with the engine, a second component element thereof being interlocked with said stepless transmission means and a third component element thereof being interlocked with the travelling wheels, characterized in that said forward/reverse changeover gearing is independently disposed without commonly utilizing said stepless transmission means or said planet reduction gearing as a forward/reverse changeover means, whereby the forward stepless speed change including the stop status is provided by the co-action of said friction type stepless transmission means together with said planet reduction gearing, and the forward/backward travelling changeover is provided by said forward/reverse changeover gearing.

Since the forward/reverse changeover gearing is independently disposed for providing the forward/backward travelling changeover, it is possible to arrange the friction type stepless transmission means so that its transmission area to be used is limited only to a high speed transmission area where slips take place hardly and subsequently power transmission efficiency is high, thus providing accurate stepless speed change, while reducing the possibility of slips in the friction type stepless transmission means.

It is an object of the present invention to provide a forward/reverse changeover gearing capable of smoothly providing forward/reverse changeover without clutch operation.

Other objects and advantages of the present invention will be apparent from the following detailed description.

BRIEF DESCRIPTION OF THE DRAWINGS

A preferred embodiment of the travelling system transmission mechanism for a tractor in accordance with the present invention will then be described by way of example with reference to the accompanying drawings in which.

DETAILED DESCRIPTION OF A PREFERRED EMBODIMENT

Figure 1:
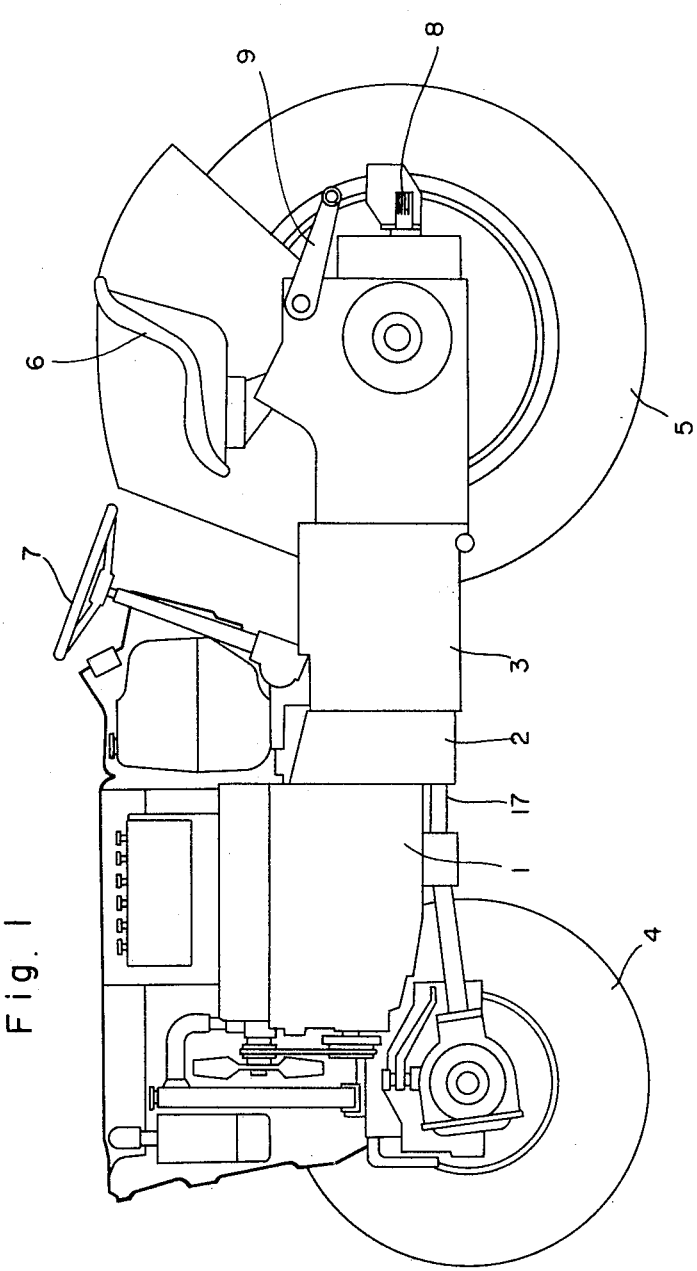
FIG. 1 is a side view of a tractor which incorporates a travelling system transmission mechanism in accordance with the present invention.

In FIG. 1, a four-wheel driven type agricultural tractor comprises an engine 1, a main clutch housing 2, a transmission case 3, front wheels 4, rear wheels 5, a seat 6, a control wheel 7, a PTO shaft 8 and an arm member 9 for lifting and lowering an attachment.

Figure 2:
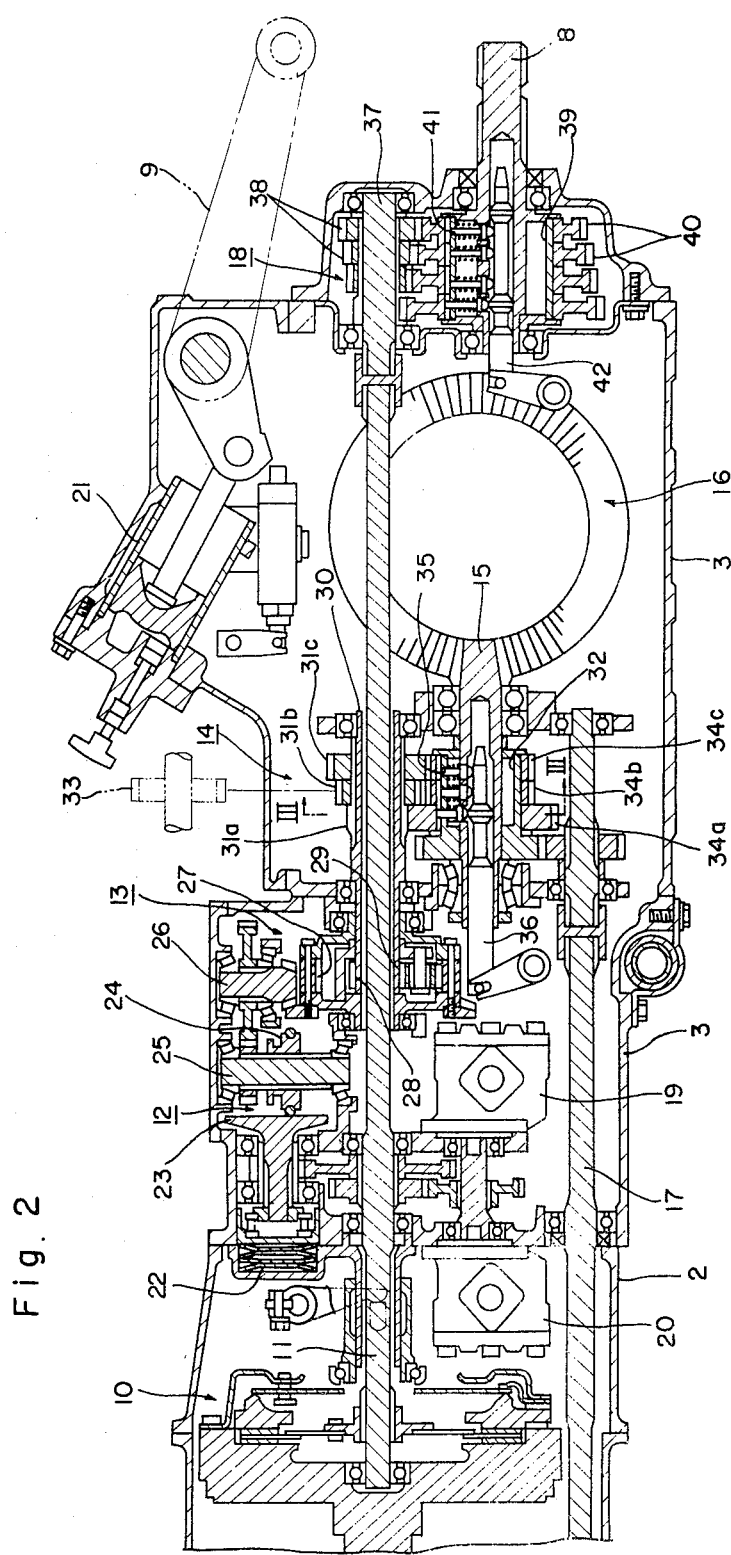
FIG. 2 is a vertical section view of the travelling system transmission mechanism.

In FIG. 2 showing the inside of the transmission case 3, power from the engine 1 is supplied to a main shaft 11 through a main clutch 10, and is then transmitted to a pinion shaft 15 after the speed ratio has been changed to a required one by a travelling system transmission mechanism comprising a friction type stepless transmission means 12, a planet reduction gearing 13 and a forward/reverse changeover gearing 14. Thus transmitted power is further transmitted to a differential gearing 16 for driving the rear wheels 5 and, at the same time, to a frontwheel driving power transmission shaft 17 supported at the lowermost part of the transmission case 3.

The friction type stepless transmission means 12 and the planet reduction gearing 13 are so disposed as to form a reverse L shape when taken a side view thereof. Disposed in the inside space defined by the means 12 and the gearing 13 are two hydraulic pumps 19 and 20 which are interlockingly geared with the main shaft 11, thus permitting the means 12, the gearing 13 and the pumps 19 and 20 to be arranged compactly.

Oil from the hydraulic pump 19 is supplied to a hydraulic cylinder 21 for driving the arm member 9 through the piping disposed inside the transmission case 3. Oil from the hydraulic pump 20 is supplied to a power stearing means (not shown) for the front wheels 4. Lubricant oil within the transmission case 3 is also utilized as working oil used by the pumps 19 and 20.

Disposed at the rear part of the transmission case 3 is a PTO shaft transmission mechanism 18 which is connected to the rear end of the main shaft 11.

The friction type stepless transmission means 12 comprises a disc 23 which is interlocked with the main shaft 11 by speedup gears so as to be rotated at a high speed and is axially spring-loaded by a belleville spring 22, a splined follower shift roller 24 in contact with the disc 23 and engaged with a roller shaft 25, and a bevel pinion shaft 26 interlocked with the roller shaft 25 by reduction gears. The contact point of the shift roller 24 with the disc 23 is changed by moving the shift roller 24, thereby to continuously change the number of revolutions of a bevel pinion shaft 26.

The planet reduction gearing 13 comprises an internal gear 27 to be drivingly rotated by the bevel pinion shaft 26, a sun gear 28 to be drivingly rotated in the reverse direction of the internal gear 27 by the main shaft 11, and planet gears 29 to be meshed with the internal gear 27 and the sun gear 28, wherein the revolution of the planet gears 29 around the sun gear 28 is taken off by a cylindrical shaft 30. Consequently, the number of revolutions of the cylindrical shaft 30 may be continuously changed from zero in a forward direction by continuously changing the number of revolutions of the bevel pinion shaft 26.

The forward/reverse changeover gearing 14 comprises forward gears 31a and 31c fixed to the cylindrical shaft 30, a reverse gear 31b fixed to the cylindrical shaft 30, forward rotatable gears 34a and 34c which are rotatably fitted to a holder 32 fixed to the pinion shaft 15 and are interlockingly meshed with the forward gears 31a and 31c, respectively, a reverse rotatable gear 34b which is rotatably fitted to the holder 32 and is interlockingly meshed with a rotatable gear 33 to be meshed with the reverse gear 31b, and engagement members 35 slidable either to a first position in which they are engaged with the rotatable gears 34a, 34b, 34c and the pinion shaft 15 at the same time, or to a second position in which they are engaged only with the pinion shaft 15.

Figure 3:
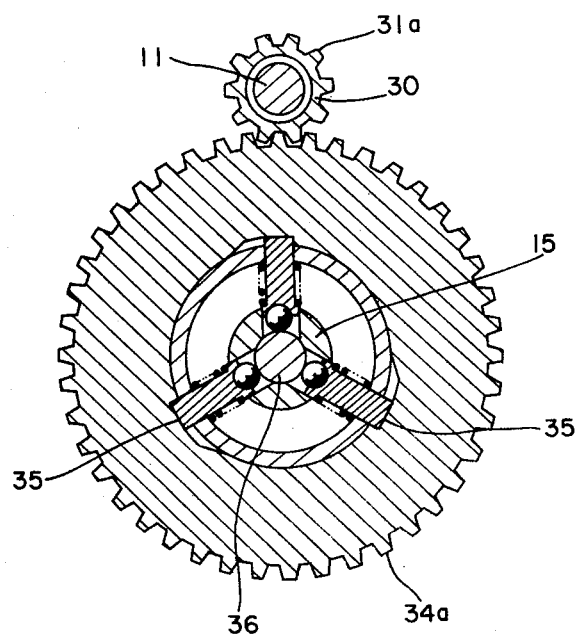
FIG. 3 is a section view taken along the line III—III in FIG. 2.

As shown in FIG. 3 in detail, forward high/low speed change, and forward/backward travelling changeover may be provided by moving a speed change rod 36 disposed within the pinion shaft 15 so as to be slidable axially thereof, for selectively changing a desired engagement member out of the engagement members 35 to said first position from said second position. In such a construction there is an advantage that smooth speed change can be readily provided because sufficient speed change is realized without specially operating the main clutch 10.

The PTO shaft transmission mechanism 18 comprises a power transmission shaft 37 coaxially connected to the main shaft 11, four gears 38 fixed to the power transmission shaft 37, four rotatable gears 40 rotatably fitted to the PTO shaft 8 through a holder 39 and always meshed with each of the gears 38, respectively, and engagement members 41 to be located either at a first position in which they are engaged with the gears 40 and the PTO shaft 8 at the same time, or a second position in which they are engaged only with the PTO shaft 8, wherein, likewise the forward/reverse changeover gearing 14, four speed change may be provided by moving a speed change rod 42 disposed within the PTO shaft 8 so as to be movable axially thereof, for changing a desired engagement member out of the engagement members 41 to said first position from said second position.

Although the forward/reverse changeover gearing 14 is disposed between the rear wheels 5 and the planet reduction gearing 13 in the present embodiment discussed hereinbefore, it may also be possible to achieve the objects of the present invention by disposing the forward/reverse changeover gearing 14 between the engine 1 and the friction type transmission means 12 so as to change the revolution direction of the engine output shaft for transmitting power to this friction type stepless transmission means 12, or between the engine 1 and the planet reduction gearing 13 so as to change the revolution direction of the engine output shaft for transmitting power to this planet reduction gearing 13.

What I claim is:

1. A tractor transmission comprising
a transmission case (3) extending longitudinally of a tractor body,
a main shaft (11) extending longitudinally in the transmission case (3) and operatively connected to an engine (1),
friction type stepless transmission means (12) disposed above said main shaft (11) and in a front position within the transmission case (3) and interlocked with the main shaft (11),
a planet reduction gearing (13) mounted on the main shaft (11) and rearwardly of the friction type stepless transmission means (12) and including a first component element (28) interlocked with the main shaft (11), a second component element (27) interlocked with the stepless transmission means (12) and a third component element (29) in engagement with the first and second component component elements (28, 27), a forward/reverse changeover gearing (14) disposed beneath the main shaft (11) and rearwardly of the planet reduction gearing (13) and operatively connected to the third component element (29),
a differential gearing (16) disposed in a rear and lower position within the transmission case (3) and interlocked with the forward/reverse changeover gearing (14),
hydraulic means (21) disposed in a rear and upper position within the transmission case (3), and
a power-take-off shaft (8) disposed in a rear end position of the transmission case (3) and operatively connected to the main shaft (11), whereby a space is defined beneath said main shaft (11) and in a front position within said transmission case (3), said space housing a hydraulic pump (19) connected to said main shaft (11) for actuating said hydraulic means (21).

2. A transmission as defined in claim 1 wherein said forward/reverse changeover gearing (14) is operatively connected to said third component element (29) of said planet reduction gearing (13) by way of a hollow shaft (30) loosely mounted on said main shaft (11).

3. A transmission as defined in claim 2 wherein said forward/reverse changeover gearing (14) comprises
   a forward gear (31a) and a reverse gear (31b) interlocked with said hollow shaft (30),
   a forward free-rotation gear (34a) interlockingly meshed with the forward gear (31a),
   a reverse free-rotation gear (34b) operatively connected with the reverse gear (31b) through a free-rotation gear (33).
   an output shaft (15) freely rotatably supporting the forward free-rotation gear (34a) and the free-rotation gear (34b),
   a first engagement member (35) adapted to switch between a position to engage the forward free-rotation gear (34a) and the output shaft (15) at the same time and a position to engage only the output shaft (15), and a second engagement member (35) adapted to switch between a position to engage the reverse free-rotation gear (34b) and the output shaft (15) at the same time and a position to engage only the output shaft (15).

4. A transmission as defined in claim 3 wherein said forward/reverse changeover gearing (14) further comprises:
   a further forward gear (31c) interlocked with said hollow shaft (30),
   a further forward free-rotation gear (34c) freely rotatably supported by said output shaft (15), and
   a third engagement member (35) adapted to switch between a position to engage the further forward free-rotation gear (34c) and the output shaft (15) at the same time and a position to engage only the output shaft (15), whereby said forward/reverse changeover gearing (14) is adapted to act also as a secondary forward speed change means.

* * * * *